(12) United States Patent
Mullen

(10) Patent No.: US 10,509,461 B2
(45) Date of Patent: *Dec. 17, 2019

(54) AUGMENTED REALITY VIDEO GAME SYSTEMS

(71) Applicant: Jeffrey David Mullen, Pittsburgh, PA (US)

(72) Inventor: Jeffrey David Mullen, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,585

(22) Filed: May 9, 2018

(65) Prior Publication Data

US 2018/0260021 A1    Sep. 13, 2018

Related U.S. Application Data

(63) Continuation of application No. 15/618,090, filed on Jun. 8, 2017, now Pat. No. 10,001,832, which is a continuation of application No. 12/249,925, filed on Oct. 11, 2008, now Pat. No. 9,703,369.

(60) Provisional application No. 60/979,379, filed on Oct. 11, 2007.

(51) Int. Cl.
| | |
|---|---|
| *G06F 17/00* | (2019.01) |
| *G06F 3/01* | (2006.01) |
| *G06F 3/0481* | (2013.01) |
| *G02B 27/01* | (2006.01) |
| *A63F 13/26* | (2014.01) |
| *A63F 13/20* | (2014.01) |

(52) U.S. Cl.
CPC ............... *G06F 3/01* (2013.01); *A63F 13/20* (2014.09); *A63F 13/26* (2014.09); *G02B 27/017* (2013.01); *G06F 3/0481* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 5,368,309 | A * | 11/1994 | Monroe | A63F 13/08 |
| | | | | 463/34 |
| 5,662,523 | A | 9/1997 | Yasumaru et al. | |
| 5,742,264 | A | 4/1998 | Inagaki et al. | |
| 5,930,741 | A | 7/1999 | Kramer | |
| 6,368,952 | B1 | 4/2002 | Rallison et al. | |
| 6,522,312 | B2 | 2/2003 | Ohshima et al. | |
| 6,685,566 | B2 | 2/2004 | Ohshima | |
| 6,853,935 | B2 * | 2/2005 | Satoh | A63F 13/00 |
| | | | | 702/94 |
| 6,951,515 | B2 | 10/2005 | Ohshima et al. | |
| 7,330,197 | B2 * | 2/2008 | Kobayashi | G06F 3/011 |
| | | | | 345/633 |
| 7,427,996 | B2 * | 9/2008 | Yonezawa | G06T 19/006 |
| | | | | 345/629 |

(Continued)

*Primary Examiner* — Paul A D'Agostino

(57) ABSTRACT

An augmented reality home console is provided. Users can wear head-mounted displays with transparent screens and can control video game indicia that are perceived as being augmented over a user's environment by displaying video game indicia onto the transparent displays. As such, for example, two users can play an airplane dog fighting game where each user controls a plane in their living room. A device that can determine surfaces of objects (e.g., walls) can be utilized such that when the airplane is flown into a wall, the airplane explodes.

20 Claims, 16 Drawing Sheets

(56) References Cited

U.S. PATENT DOCUMENTS

| | | | |
|---|---|---|---|
| 7,690,975 B2 * | 4/2010 | Watanabe | A63F 13/10 345/581 |
| 7,830,334 B2 * | 11/2010 | Takemoto | G06T 19/006 345/7 |
| 8,585,476 B2 * | 11/2013 | Mullen | A63F 13/25 463/1 |
| 8,624,962 B2 * | 1/2014 | Lopes | G06T 19/00 348/50 |
| 8,717,294 B2 * | 5/2014 | Weising | G09G 5/08 345/158 |
| 10,001,832 B2 * | 6/2018 | Mullen | G06F 3/01 |
| 2002/0010734 A1 * | 1/2002 | Ebersole | H04L 29/06 709/201 |
| 2002/0037768 A1 | 3/2002 | Ohshima | |
| 2002/0075286 A1 | 6/2002 | Yonezawa et al. | |
| 2003/0005439 A1 * | 1/2003 | Rovira | H04N 7/163 725/37 |
| 2003/0062675 A1 * | 4/2003 | Noro | A63F 3/00643 273/237 |
| 2003/0156144 A1 * | 8/2003 | Morita | G06F 3/011 715/848 |
| 2003/0184602 A1 | 10/2003 | Kuroki et al. | |
| 2003/0210228 A1 | 11/2003 | Ebersole et al. | |
| 2004/0104934 A1 | 6/2004 | Fager et al. | |
| 2004/0110565 A1 | 6/2004 | Lavesque | |
| 2004/0150666 A1 | 8/2004 | Fager | |
| 2005/0231419 A1 | 10/2005 | Mitchell et al. | |
| 2005/0245302 A1 | 11/2005 | Bathiche et al. | |
| 2006/0082643 A1 | 4/2006 | Richards | |
| 2006/0105838 A1 * | 5/2006 | Mullen | A63F 13/25 463/31 |
| 2006/0258454 A1 | 11/2006 | Brick | |
| 2007/0024644 A1 * | 2/2007 | Bailey | G06F 3/011 345/633 |
| 2008/0024597 A1 * | 1/2008 | Yang | A63F 13/02 348/53 |

* cited by examiner

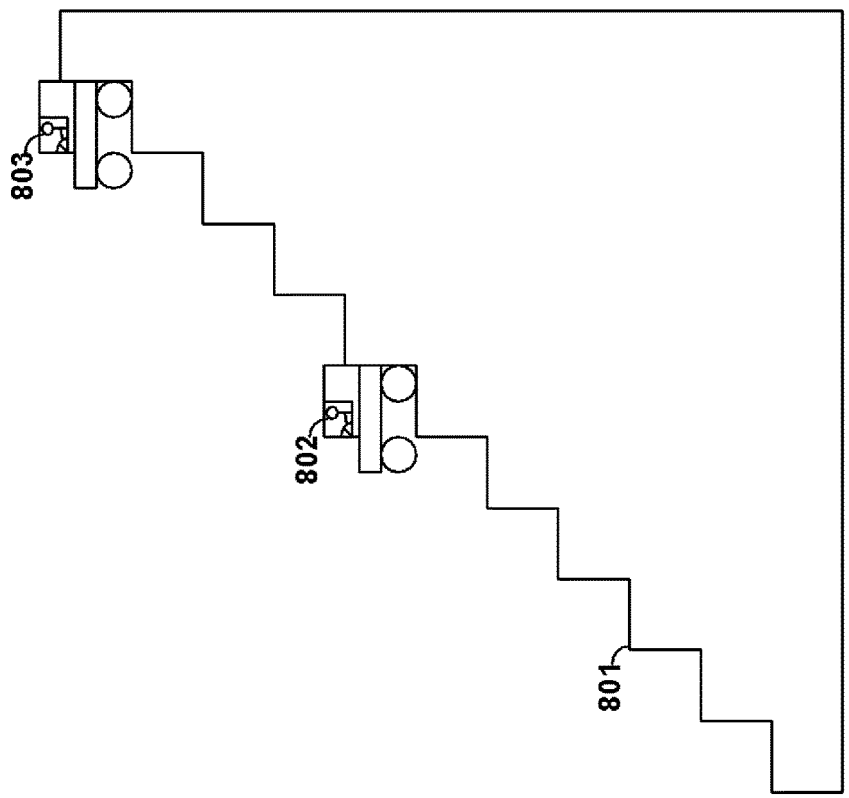
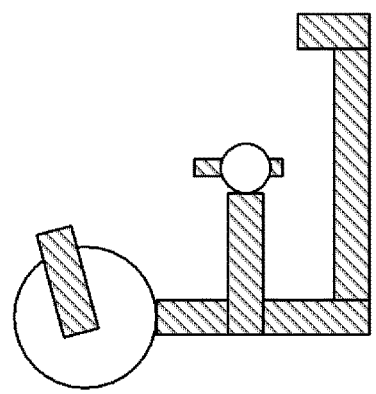
800
FIG. 8

AUGMENTED REALITY VIDEO GAME SYSTEMS

CROSS-REFERENCE TO RELATED APPLICATIONS

This application is a continuation of U.S. patent application Ser. No. 15/618,090 filed on Jun. 8, 2017, which is a continuation of U.S. patent application Ser. No. 12/249,925 filed on Oct. 11, 2008, which claims the benefit of U.S. Provisional Patent Application No. 60/979,379 filed on Oct. 11, 2007, which are hereby incorporated by reference herein in their entirety.

BACKGROUND OF THE INVENTION

This invention relates to augmented reality.

SUMMARY OF THE INVENTION

Augmented reality video game systems are provided. Video game indicia may be perceived to be located in a user's physical environment through virtual indicia that are placed on a head-mounted display. The head-mounted display may be transparent such that the user can look through the transparent display and see his/her physical environment. Video game indicia may then be provided on this transparent screen such that video game indicia are introduced into the user's perspective of his/her environment. Alternatively, video game indicia may be interlaced back into image data that was captured (e.g., video) and this interlaced image data may be displayed to a user (e.g., via a head-mounted display) such that the user can see an image of his/her environment and the interlaced video game indicia. Accordingly, for example, a non-transparent display may provide a user with a view of his/her environment and interlaced virtual objects. Alternatively, for example, the video of a user's environment may be interlaced with virtual objects and displayed on a transparent display. A head-mounted display may be provided and may include multiple transparent or non-transparent displays. For example, a different transparent or non-transparent display may be provided for each eye. Different video may be captured for each eye's display (e.g., from two or more video cameras) and virtual indicia may be interlaced into each of the video streams and provided to the displays in or near real time. If, for example, each display is transparent, virtual indicia may be directly displayed on such a transparent display. Such transparent or non-transparent displays may be flexible displays.

A camera may be attached to the head-mounted display to continually capture images (e.g., a video camera) of a user's environment. The data collected from this camera may be processed such that, for example, the surfaces of objects may be detected. In this way, video game indicia may interact with objects as data is collected, processed, and utilized to affect video game indicia in real-time.

Accordingly, for example, an augmented reality console may be placed underneath a table. Two users may then sit at a table and turn ON their head-mounted displays. The video camera from the head-mounted displays may detect the presence of a table. The two users may then select to play a fighting game. A video game character may then be placed on the table for each person by the video game system by changing the user's perspective of the table by providing video game indicia onto the head-mounted display. Accordingly, the users may utilize hand-held controllers to control their respective fighters. If a user adds a physical object to the table like a large book, the detection system (e.g., video camera or radar and associated processing) may detect the surfaces of the book. Accordingly, the fighters may be able to, for example, jump onto the book or duck and hide behind the book (e.g., such that a fighter is removed from the line-of-fire of another fighter). The components of a game console may be provided in a head-mounted display such that video game console capabilities may be portable. Positioning systems (e.g., local positioning systems or satellite-based positioning systems) may be included in a head-mounted display, controller, or other device. Inertial movement detection systems may be included in a head-mounted display, controller, or other device. Positioning systems may be used with inertial movement systems in order to increase the accuracy of location determinations for a head-mounted display, controller or other device. Particularly, for example, a positioning system may periodically determine the location of a user and the inertial movement system may determine the location of a user between the periodic position determinations by the positioning system. An inertial system may include, for example, an array of one or more accelerometers and/or gyroscopes.

An augmented reality game may be played remotely with another augmented reality system. The respective location, for example, of characters to an origin point may be transmitted to another augmented reality system and this may be utilized to generate video game indicia at the other system. Additionally, control information (e.g., ACTION button) may be transmitted between systems.

Gyroscopes and/or accelerometers (e.g., inertial movement detection devices) may be utilized in a head-mounted display to determine the viewing perspective of the user as well as the change in location of a user. For example, the user may be looking at the ceiling in one location at one instance and may be looking at the floor in a second location at a second instance. Inertial movement determination systems may be utilized to, for example, determine the acceleration of an object (e.g., a head-mounted display). This acceleration information may be utilized, in turn, to determine the velocity of an object. This velocity information may be utilized, in turn, to determine the position of a device (e.g., with respect to an origin such as a periodic position determination from a positioning system such as a receiver for receiving global positioning system satellite signals.

Computer-controlled video game indicia may be provided as part of a video game. A user may control, via, for example, hand-held controls the movement and action of one or more video game indicia. Hand-held controls may include, for example, a controller such as a control object (e.g., cylinder) or glove. A user may utilize multiple controllers to play a game or utilize an augmented reality system (e.g., two controllers—one for each hand). Augmented-reality environments may be utilized to augment the perspective of physical objects. For example, augmented water may be placed on the top of a table such that an augmented reality boat racing, swimming, surfing, scuba diving, and/or fishing game may be played.

Inertial movement determination devices may also be utilized in controllers, for example, and control signals may be based off outputs from such inertial movement determination devices.

A game console may provide wireless communication signals that each head-mounted device (HMD) device (and/or controllers) can receive and utilize to assist in locating the HMDs' (and/or controllers') location with respect to the console. The locations of two HMDs' may also be determined by instructing each of the HMDs to look at the playfield and then location can be determined, in software, based off the user perspectives of the physical playfield (e.g., the table). Devices may be placed around the room to provide wireless communications signals that can be utilized (e.g., in a triangulation algorithm) the location of a HMD. The location of the playing area may be configured during a setup feature of a video game system and a user may control the location and size of the playfield during the setup feature.

Games may be constructed to be played on different playfields. For example, a user may be prompted to go to their kitchen table and play on their kitchen table. The user may be prompted to notify the system when the user is looking at the kitchen table. The user may also be prompted to walk around, while looking at, the kitchen table. In this manner, the system may detect the kitchen table such that a game may be played on the kitchen table. Similarly, a game may request that a user look at a wall. Similarly still, for example, a game may request that the user sits at the bottom of a stairwell and looks up in order to play a game. A single game may have levels that utilize different types of physical surfaces (e.g., tabletop, wall, stairwell, floor, sink, bed, couch, TV screen).

A head-mounted display may also be utilized, for example, to immerse a user into a virtual world such that a user cannot see any of his/her surroundings. Such a virtual reality topology may be attained from transparent or non-transparent display.

An augmented reality game console may be utilized, for example, as an augmented reality computing platform. Accordingly, for example, a user may utilize an augmented reality console (which may be located inside a head-mounted display) to display virtual objects such as virtual hardware. Accordingly, a user may create virtual hardware such as virtual projectors, television sets, cellular phones, virtual game devices (e.g., virtual instruments such as virtual drums, virtual gaming playmats). A user may add, delete, and modify virtual hardware to his/her physical environment utilizing a virtual graphical user interface.

An augmented reality computing platform may allow, for example, a user to change his/her environment. Accordingly, an augmented reality computing platform may allow a user to select a theme for his/her physical environment. A theme may be, for example, an Americana theme. Another theme may be, for example, a Japanese theme. Accordingly, virtual Americana objects may be placed around a user's physical environment when an Americana theme is selected. These virtual objects may be stationary or may move in a pre-determined or customized manner. A user may select, for example, the environment the user desires and then add associated virtual hardware objects. Virtual hardware objects may have different themes depending on the environment that is chosen. For example, a beach environment and a selection of a 1,000×1,000 ft virtual drive in movie-theater screen over a virtual ocean may cause the movie-theater screen to be provided in a beach theme (e.g., virtualized in summer colors). Accordingly, for example, an augmented reality computing platform would allow users to purchase a small number of augmented reality computing devices (e.g., a single) head-mounted display to virtualize numerous physical objects instead of purchasing the numerous physical objects individually. Different costs may be associated with different virtual hardware objects such that a user can purchase such virtual objects from an augmented reality graphical user interface.

Third-party manufacturers may provide different programs of the same virtual hardware (e.g., different virtual television sets) that are each branded with the logo and appearances programmed by the third-parties and, accordingly, may each charge their own cost. The manufacturer of the augmented reality system may, in turn, allow users to purchase and download the virtual hardware code from a third-party manufacturer for a set-fee, a commission, or any other pricing structure. The same virtual hardware objects may be provided with different functionality and such different virtual objects may be associated with different costs. For example, one virtual projector may be able to project in a particular resolution with a particular set of colors up to a particular maximum size. A second virtual projector may be able to project at a different resolution, with a different set of colors, up to a different maximum size.

Users of virtual hardware may, for example, share the virtual hardware in a physical environment with another user. Accordingly, a user may request permission to see another user's augmented environment. The requested user may grant permission to the requesting user. This permission may be associated with different access levels and an access level may be selected by a user. For example, a permission access level may be to allow a requesting user to watch a user's virtual television set, but not see the user's virtual browser. The location and visual information to display such virtual hardware (or other virtual objects) may be communicated wireless, or via a wire, to the requesting user's head-mounted display. A user may add, remove, or edit, augmented indicia access rights (e.g., viewing rights) at any time.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 8 is an illustration of an augmented reality video game system and associated video game being played on a physical environment constructed in accordance with the principles of the present invention;

DETAILED DESCRIPTION OF THE INVENTION

Figure 1:
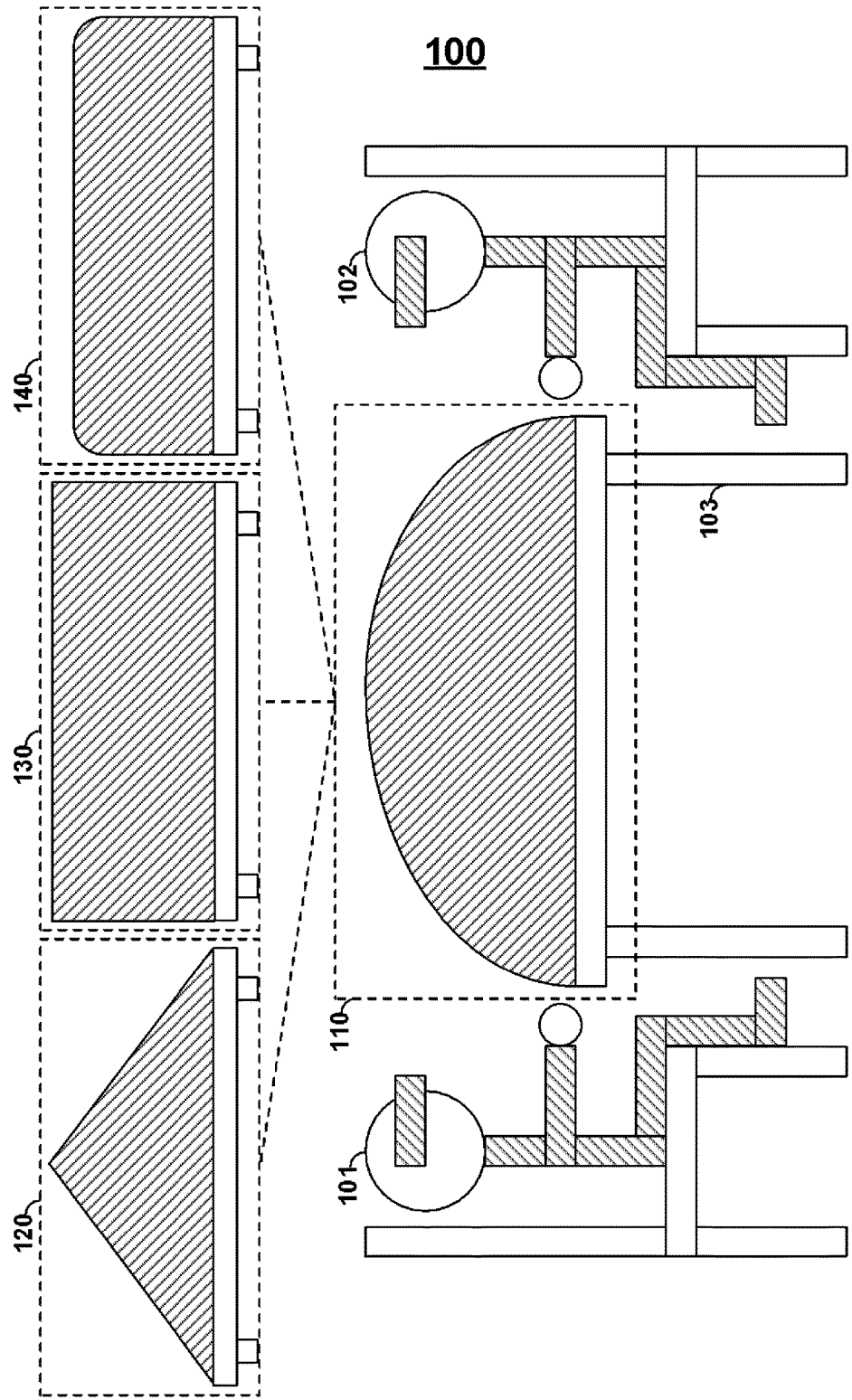
FIG. 1 is an illustration of an augmented reality video game system constructed in accordance with the principles of the present invention.

FIG. 1 shows augmented reality setups 100 that may include users 101 and 102 utilizing table 103 as a playing surface for an augmented reality video game system. The users may select one of a number of playing areas for an augmented reality video game. For example, users may select to play a game within the confines of area 120, 130, 140, and 110. Users may also change the size and shape of a three-dimensional area manually. An area may be shown to a user in a color (e.g., green) such that a user can visually see where the area will be. During game play, a border of a light color may be provided such that the users of the system are aware of the game area. If an object (e.g., a user controlled object) attempts to leave the area, the game may stop the object from leaving the area. At any time, a game may be paused and a play area may be modified. Similarly, for example, when a game is saved, area dimension information may be saved along with a game. When a user returns to play the saved game at a later time, the user may be automatically requested to confirm the saved area dimensions (and the user may be provided with a visual representation of the area to confirm). An object leaving the confines of a game area may, for example, be destroyed and a game may be accordingly affected. For example, a user that drives a virtual vehicle (e.g., plane, space shuttle, car, robot, boat, airplane) into the boundary of a three-dimensional play area may be perform an animation (e.g., explode) when a boundary is hit and points/character lives may be reduced for a user. A game may alternatively, for example, end. Persons skilled in the art will appreciate that a game may be provided with a default boundary (e.g., a dome-shaped boundary as in play area 110). A user may be provided with the ability to scale the area. When a play area is scaled (e.g., increased in size or decreased in size) the virtual objects of the game may be proportionally scaled by the video game (e.g., increased in size or decreased in size).

Alternatively, for example, a game may be provided in a user-selected play area of varying size with virtual objects of the same size. A user-controllable virtual object (e.g., a virtual vehicle) may be provided at the center of a play area and user-controls may cause the environment to move with respect to the virtual vehicle such that the vehicle stays in the same location within a virtual environment. Such a play methodology may be user-selectable (e.g., an environment moving methodology or a vehicle moving methodology). Accordingly, a user may be provided with the flexibility to play the same game in different physical environments (e.g., in a car on a user's lap versus in a room with a large floor). Similarly, for example, virtual environment indicia may be stationary and a user-controlled object may explore the virtual environment indicia until, for example, the user-controlled object reaches a boundary threshold (e.g., a boundary or a proximity to a boundary). At this point, for example, the environment may scroll with the user-controls such that if an user-controlled object reaches the threshold then the vehicle would stop but the environment would move such that the user perceives the vehicle to be moving at the same speed and in the same direction with respect to the virtual environment indicia.

A game console may process a game or a head-mounted display may process a game (and, in multiplayer modes may share information with another head-mounted display). A game area may be, for example, dome shaped, pyramid shaped, cubed shaped, cylindrically shaped, rectangular shaped, or spherically shaped. Edges may be rounded. Heights, width's, and length's may be user adjusted. A user may store his/her preferred play area parameters (or a list of preferred parameter play areas) on a console or head-mounted device and games may automatically utilize a user's stored area preference (e.g., for a location).

A head-mounted display may include, for example, a device, such as a camera, for use in determining the landscape of a use's environment. Such a device may provide signals (e.g., images) to a processing device (e.g., central processor). In turn, for example, the central processor may determine where to best provide a play area and may autonomously provide a preview of that play area to a user. A user may be directed (via virtual indicia) to look at a particular object (e.g., a floor or table) where the game is intended to play so that the augmented reality platform is quickly able to provide a preview of a play area.

An augmented reality computing platform (e.g., a head-mounted display) may recognize physical objects. For example, a platform may recognize the difference between a wall, table top, floor, stairs, and a doorway. A platform may sense multiple areas in a room where play could occur and may, for example, utilize selection criteria to determine the best area for play. For example, the platform may base the best play area on surface size or volume size. Furthermore, for example, a platform may provide a user with multiple play areas such that a user can select an area for play (e.g., by looking at the area and saying "play"). An augmented reality computing platform may utilize physical manual control interfaces to receive information. An augmented reality computing platform may also utilize an audible speech interfaces to receive information.

Persons skilled in the art will appreciate that image data from a video camera can be, for example, processed in real time to determine the surface structure and boundary structure of objects. Similarly, for example, these determined surface and boundary structures may be utilized to assist in properly aligning and interlacing virtual indicia as a user changes his/her perception of a gaming play area or walks through a gaming play area.

Figure 2:
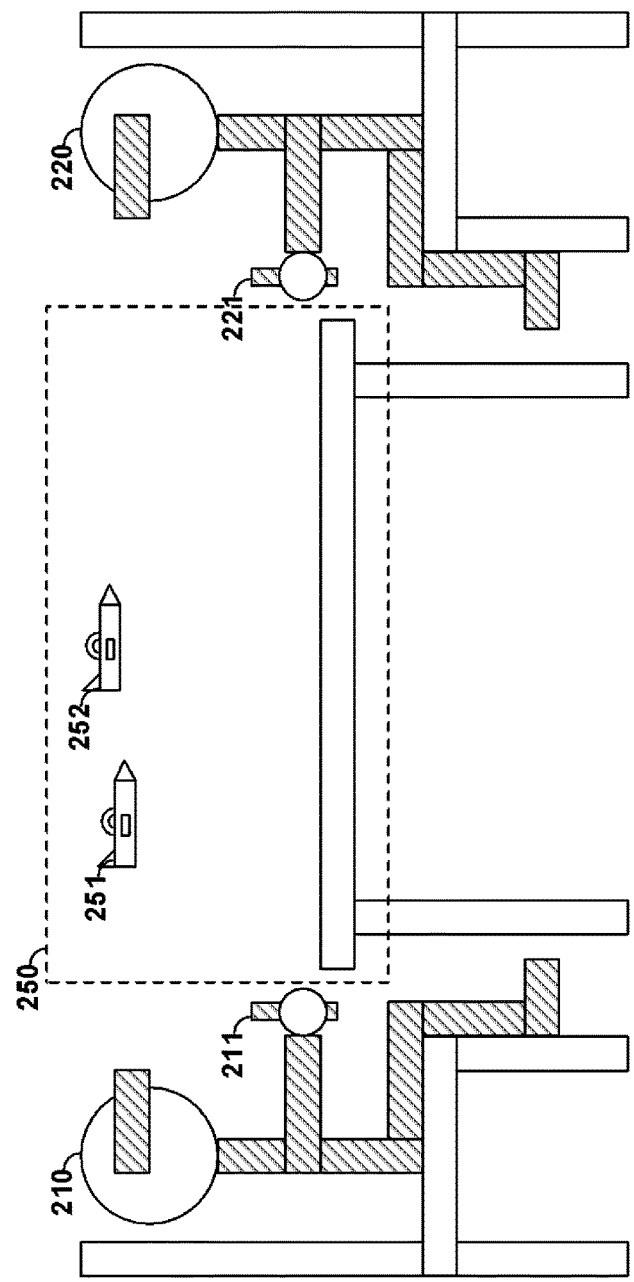
FIG. 2 is an illustration of an augmented reality video game system and associated video game constructed in accordance with the principles of the present invention.

FIG. 2 shows game topology 200 having game area 250, in which user 210 controls object 251 via controller(s) 211 and user 220 controls object 252 via controller(s) 221. User 210 may utilize controller 211 to move object 251. Physical interfaces may be provided on a controller to accept manual input such as buttons, joysticks, directional pads, and touch interfaces. A controller may also receive input through controller movement. Inertial movement determination devices may be included as well as positioning devices such that a user may, for example, control a virtual object by moving a controller. The pitch, roll, and yaw of a controller may be utilized as control signals to an augmented reality computing platform. A display screen may be provided on a controller such that a user may utilize this display screen to privately view information about a game. Alternatively, one user may be provided with private virtual indicia in play environment 250. Accordingly, multiple users may be provided with the same virtual indicia within area 250 or may be provided with different virtual indicia within area 250.

Games may include, for example, board games, racing games, fighting games, adventure games, sports games (e.g., football, soccer, tennis, baseball, basketball), role playing games, educational games or any other type of game. A play area may be provided about a physical object (e.g., a table). For example, a play area may extend onto the sides of a table such that a user can be provided with virtual objects that appear to come out from under the table. Furthermore, for example, a game area may include both the top and bottom surfaces of a table such that a user (e.g., a child) may be motivated to physically move (e.g., exercise) to play the game. For example, a virtual object may be provided that is able to drive on the top surface of a table, the side surfaces of a table, and the bottom surface of a table. Accordingly, a virtual car may be provided that appears to defy gravity. Such game play may, for example, increase the whimsical and festive nature of a game.

Figure 3:
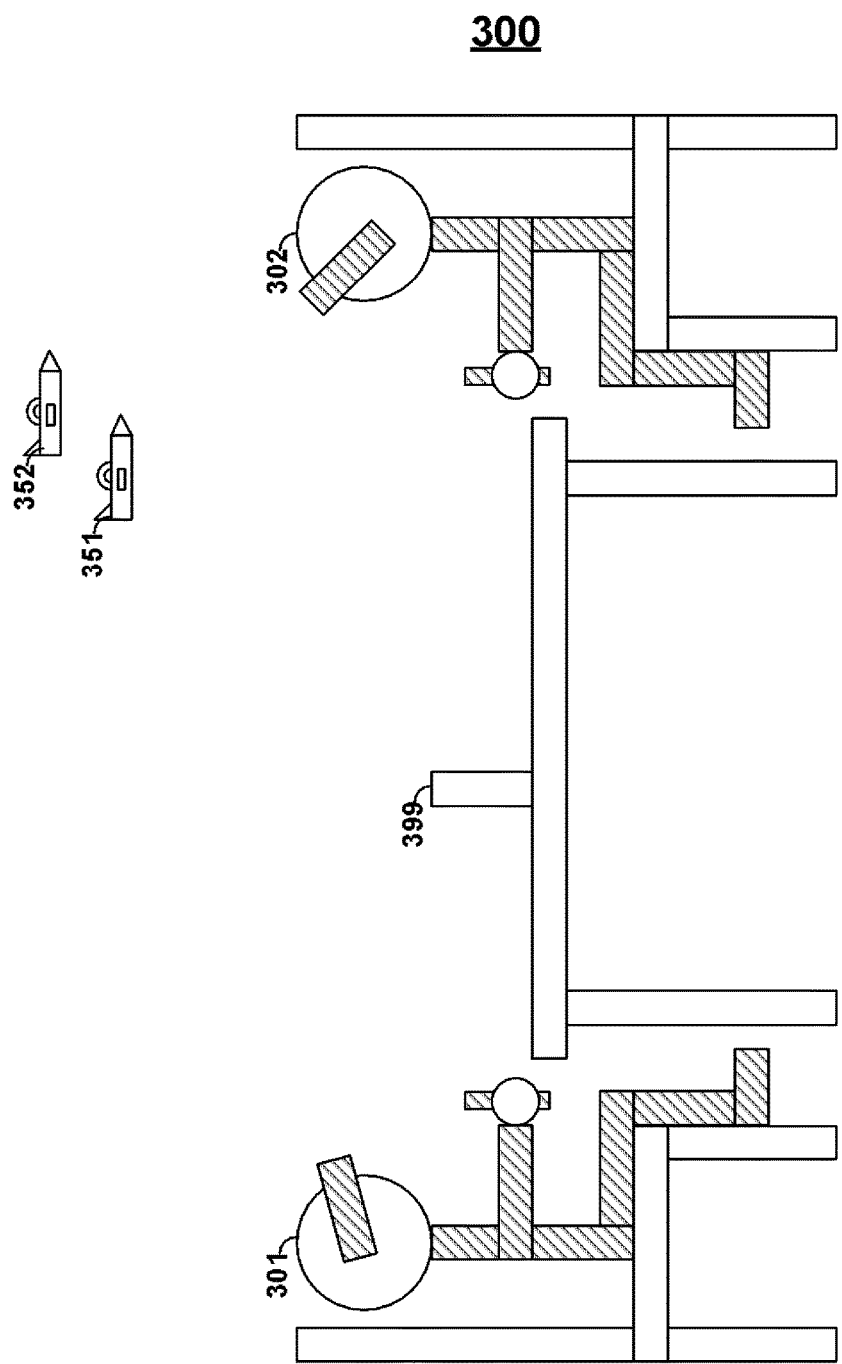
FIG. 3 is an illustration of an augmented reality video game system and associated video game played in an environment with a physical obstacle constructed in accordance with the principles of the present invention.

FIG. 3 shows game topology 300 in which no game area is set. Person skilled in the art will appreciate that a game may be provided that is not confined to an area of play. A user may walk around his/her actual environment to and the game may be played in his/her actual environment. User 301 may control virtual object 351 and user 302 may control virtual object 352. Physical surroundings (e.g., object 399) may be detected (either prior to a game during setup and/or during a game) and virtual objects may interact with such physical objects. For example, if a user places object 399 onto a table, plane 351 may be animated to crash into object 399 instead of animated to pass through object 399. Deployable sensors may be provided that may be attached to objects to assist in determining the location of the objects or to provide objects with certain capabilities. For example, one sensor may cause a game to utilize an object as a reward object (e.g., touching it gives a user a game point) while another sensor may cause a game to utilize the same object as a penalty object (e.g., touching it subtracts a game point for a user). Alternatively, for example, a user may utilize a graphical user interface (e.g., via a display on a controller or a graphical interface augmented onto a user's physical environment) to associate object characteristics to a physical object. A game may provide virtual indicia onto a physical object to indicate to one, more than one, or all users of a game of the characteristics of an object. For example, a reward object may be given a green tint by an augmented reality gaming console while a penalty object may be given a red tint by an augmented reality console.

Figure 4:
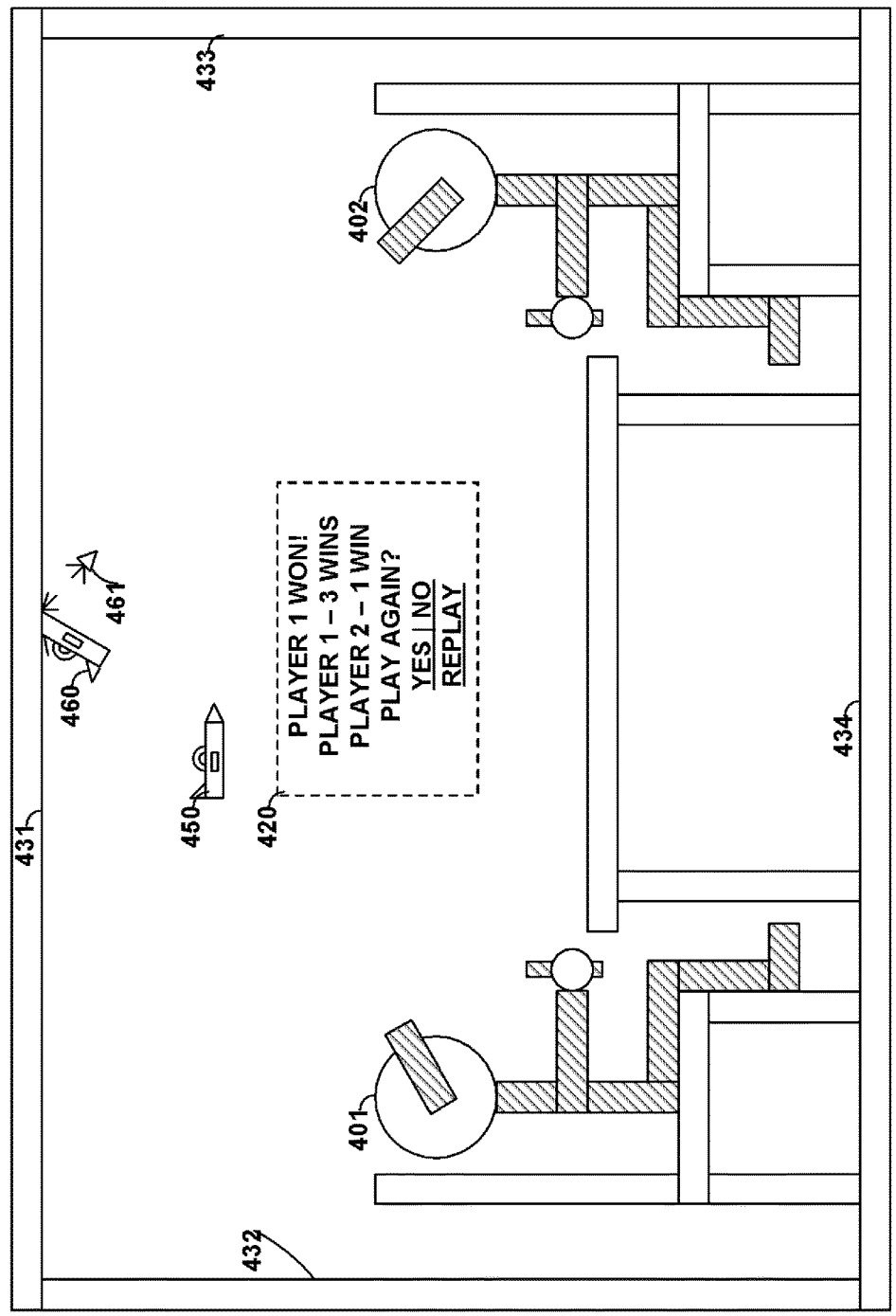
FIG. 4 is an illustration of an augmented reality video game system and associated video game and virtual indicia constructed in accordance with the principles of the present invention.

FIG. 4 shows game topology 400 that may include a room having ceiling 431, walls 432 and 433, and floor 434. Games may request that the game be played on a particular surface (e.g., a floor, against a wall, a stairwell, a sink, a backyard, a tree, a pond, a beach). Such a request may assist a system to determine an object's surface structure (e.g., a stairwell or floor). For example, a game may instruct a user to "look at the ceiling and press button A." The system may then utilize the knowledge of what the user is looking at in order to provide a better augmented reality environment (e.g., an augmented reality game). As per another example, a game may instruct a user to look at the top of a table and provide a manual control signal to confirm the action was taken. The video game system may submit multiple such requests to a user such that, for example, the game may begin to build a model of the user's environment before the user begins to play in the environment. The model of a user's environment can expand and mature as a game progresses as a result of an object detection device (e.g., a video camera). Accordingly, virtual indicia may interact with a user's environment (from the perspective of a user).

User 401 may control object 450 while user 402 may control object 460. In topology 400, user 402 has flown object 460 into ceiling 431. The game system has detected that a virtual/physical collision has occurred and has provided a response that meets this virtual/physical collision condition to the user—in this case a crash that has resulted in object 461 separated from object 460 and results indicia 420 being displayed to both user 401 and 402. Results 420 may be displayed and may rotate such that both user 401 and 402 may view results 420. Results 420 may include any information such as, for example, the player that won, how many times each particular player has won, the opportunity for a user to request the game be played again, or a replay of the game that was previously played. If a replay is selected, the users may sit back and watch the match be autonomously replayed on their physical surroundings. As such, information about how a game progresses may be saved while a game is being played such that, for example, the information can be retrieved and the game can be replayed to a users (or users).

Figure 5:
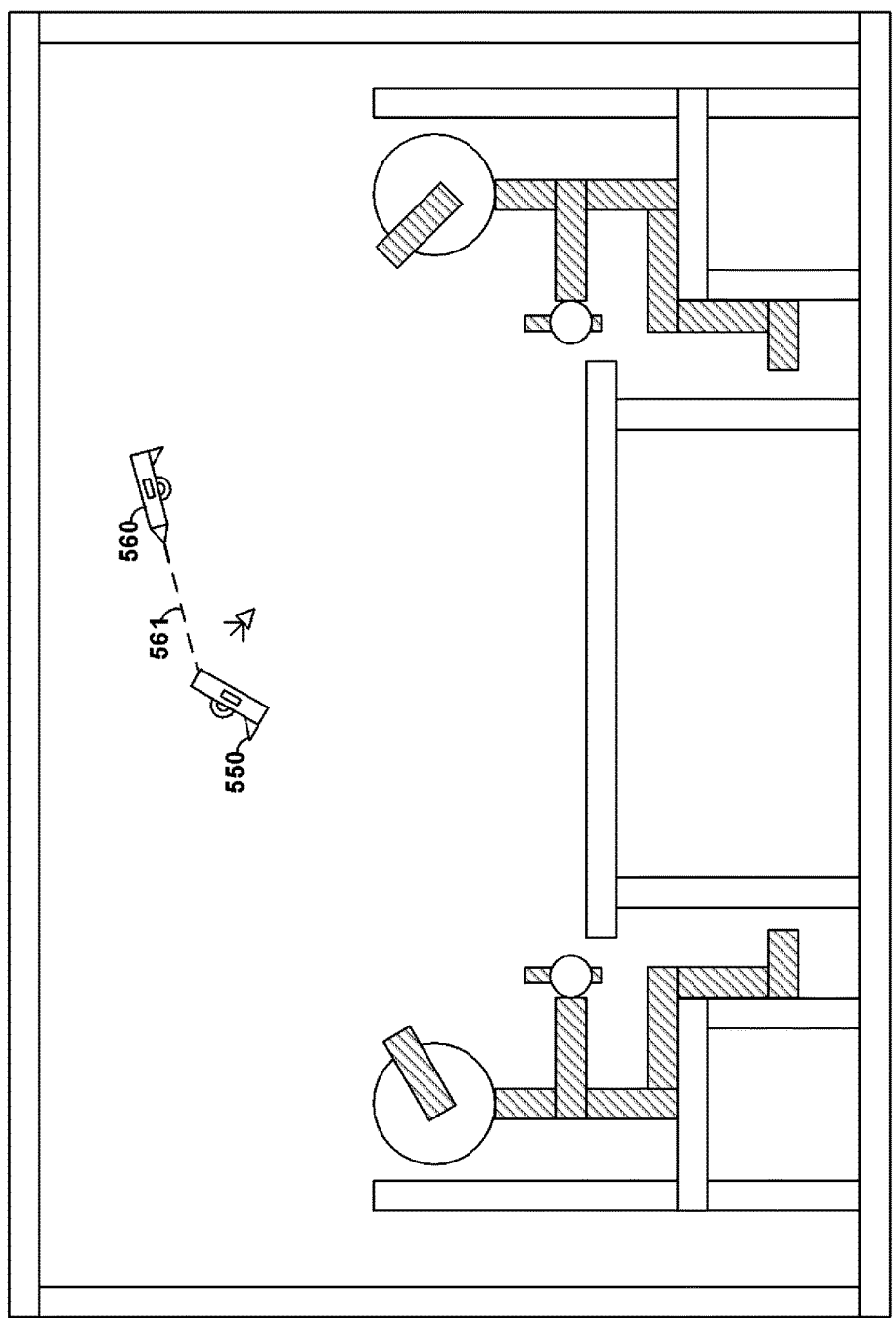
FIG. 5 is an illustration of an augmented reality video game system and associated video game constructed in accordance with the principles of the present invention.

FIG. 5 shows game topology 500 that may include object 550 controlled by one user and object 560 controlled by another user. Persons skilled in the art will appreciate that computer-controlled objects may also be provided and augmented onto the physical surroundings by changing the perspectives of one or more users. The user controlling object 560 may provide a control signal to the game such that object 560 provides an ACTION such as SHOOTING. In this way, for example, a user can control a virtual object and attempt to destroy—via SHOOTING—a virtual object controlled by another user. An object that is attacked (e.g., SHOT) may be damaged and may perform differently. For example, if a virtual plane is shot by another virtual plane, an engine may be destroyed and the speed of the damaged virtual plane may be affected (e.g., slowed).

Figure 6:
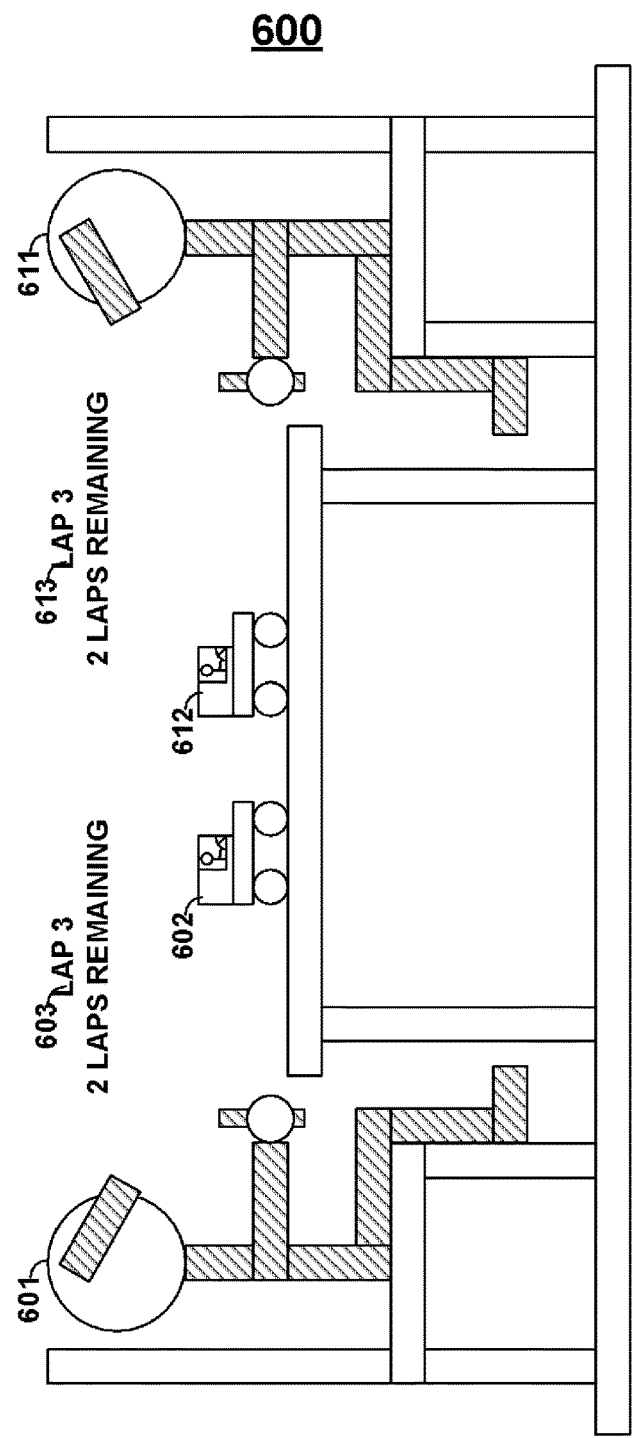
FIG. 6 is an illustration of an augmented reality video game system and associated video game with virtual indicia constructed in accordance with the principles of the present invention.

FIG. 6 shows game topology 600 that may include user 501 controlling object 602 and user 611 controlling object 612 on the surface of a table. Game information indicia 603 and 604 may be displayed to one, some, or all users. For example, game information indicia 603 and 604 may be identical. However, game information indicia 603 may be placed close to user 601 and game indicia 613 may be placed close to user 611. Accordingly, game indicia 613 and 611 may not need to, for example, rotate and may instantly provide information to a particular user. Indicia, such as result and game information indicia, may be provided in three dimensional lettering in order to increase the whimsical and festive nature of the information and allow the information to be more easily recognized from different perspectives.

Figure 7:
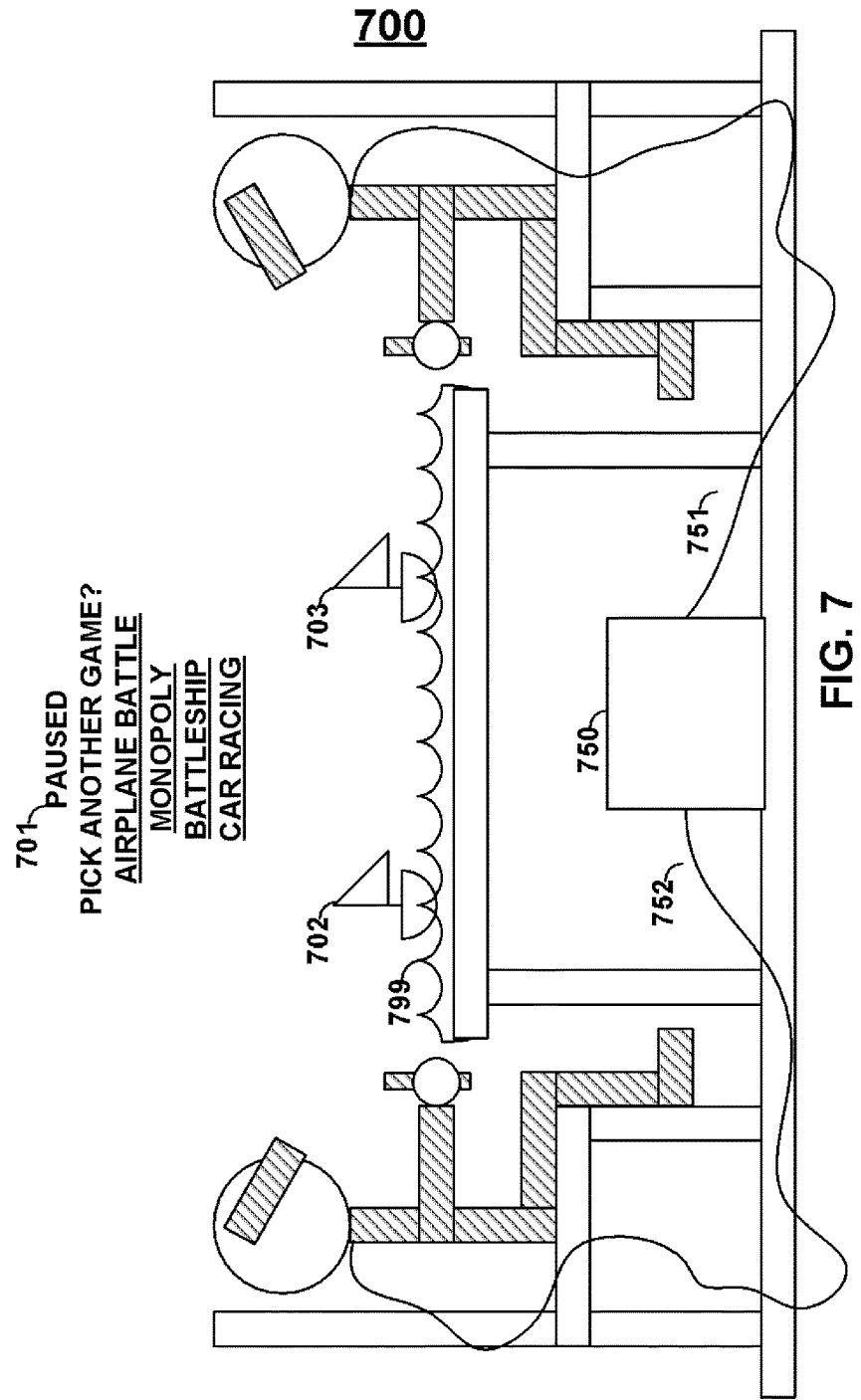
FIG. 7 is an illustration of an augmented reality video game system constructed in accordance with the principles of the present invention.

FIG. 7 shows game topology 700 that may include game console 750 that is coupled to head-mounted displays via wires 752 and 751. Controllers (and/or head-mounted displays) may be wire-based or wireless. Power may be transmitted wirelessly to head-mounted displays or controllers. Virtual surface 799 may be provided over a surface by augmenting a user's perspective of a surface through a head-mounted display. Accordingly, users may control objects 702 and 703 which may, in turn be controlled about virtual surface 799. Virtual game information 701 may be provided that may include, for example, the status of a game (e.g., the game is PAUSED) and/or the option to pick another game. Examples of augmented reality games may include, for example, monopoly, car racing, battleship, airplane dog fights, boat racing, and combat fighting. A user may select a virtual indicia representative of an option by, for example, utilizing manual controls, via a voice activation, or by moving a virtual object such that the virtual object interacts with the option (e.g., flying a virtual plane through the option to play monopoly).

FIG. 8 shows game topology 800 that may include, for example, stairway 801 in which objects 802 and 803 are computer controlled. A game may, for example, not have any user-controlled virtual objections that interact with a physical surface. A user may be provided with a gun, for example, that may shoot virtual bullets towards computer-controlled objects in order to destroy the computer controlled objects. The controller may include positioning and orientation devices in order to determine the position and orientation of the controller. Accordingly, this information may be utilized to calculate a trajectory for a virtual projectile and the virtual projectile may be shot according to the determined trajectory.

Figure 9:
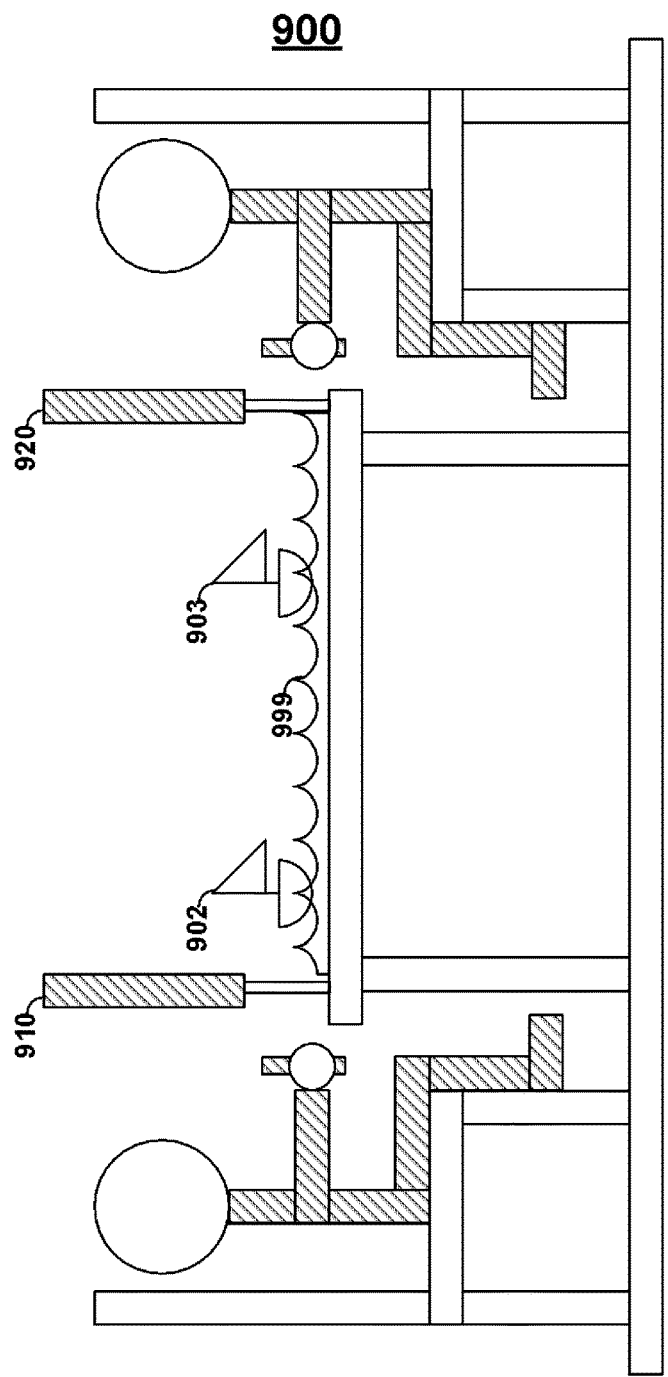
FIG. 9 is an illustration of a video game system constructed in accordance with the principles of the present invention.

FIG. 9 shows game topology 900 that may include monitors 910 and 920 through which virtual objects 902, 903, and 999 may be seen. For example, a user may look through monitor 910 and may see objects 902, 903, and 999. The monitor may be transparent such that the virtual indicia are displayed on the monitors. Alternatively, video of the environment obstructed by the monitor may be shown on the monitor and virtual objects 902, 903, and 999 may be displayed on the video feed (in the appropriate location). A video camera may be coupled to the monitor or may reside in the monitor to capture a video. The video may be processed to determine the attributes of the physical surroundings in front of the monitor. Monitors may communicate with each other to ensure, for example, that all monitors are viewing the same physical surroundings. For example, the monitors can make sure they are a particular distance from a common origin and are facing the appropriate direction (at the appropriate angle) from that common origin.

A portable hand-held gaming system may include a display and game controls (e.g., manual buttons, directional pad, joystick, and/or inertial movement and positioning determination systems). The portable gaming system may include a camera. The camera may take video from the back of the portable gaming system such that a user may see the video from a display located on the front of the gaming system. The gaming system may have a rechargeable and/or replaceable battery. The game may wireless download and/or include a port to accept media (e.g., cartridges) that has game logic imprinted thereon. The user may be displayed the video through the display of the portable gaming system and the gaming system may interlace virtual indicia into the video feed such that a user can utilize a portable gaming device to play a game. The screen of the portable hand-held may also be a touch-screen. Furthermore, multiple screens (e.g., two or three) may be provided. Real time video with enhanced virtual images may be provided on one, more than one, or all such display screens. One, more than one, or all such displays may be, for example, touch sensitive. Features of an augmented reality game may be provided to such a hand-held device (e.g., game area selection and play).

Figure 10:
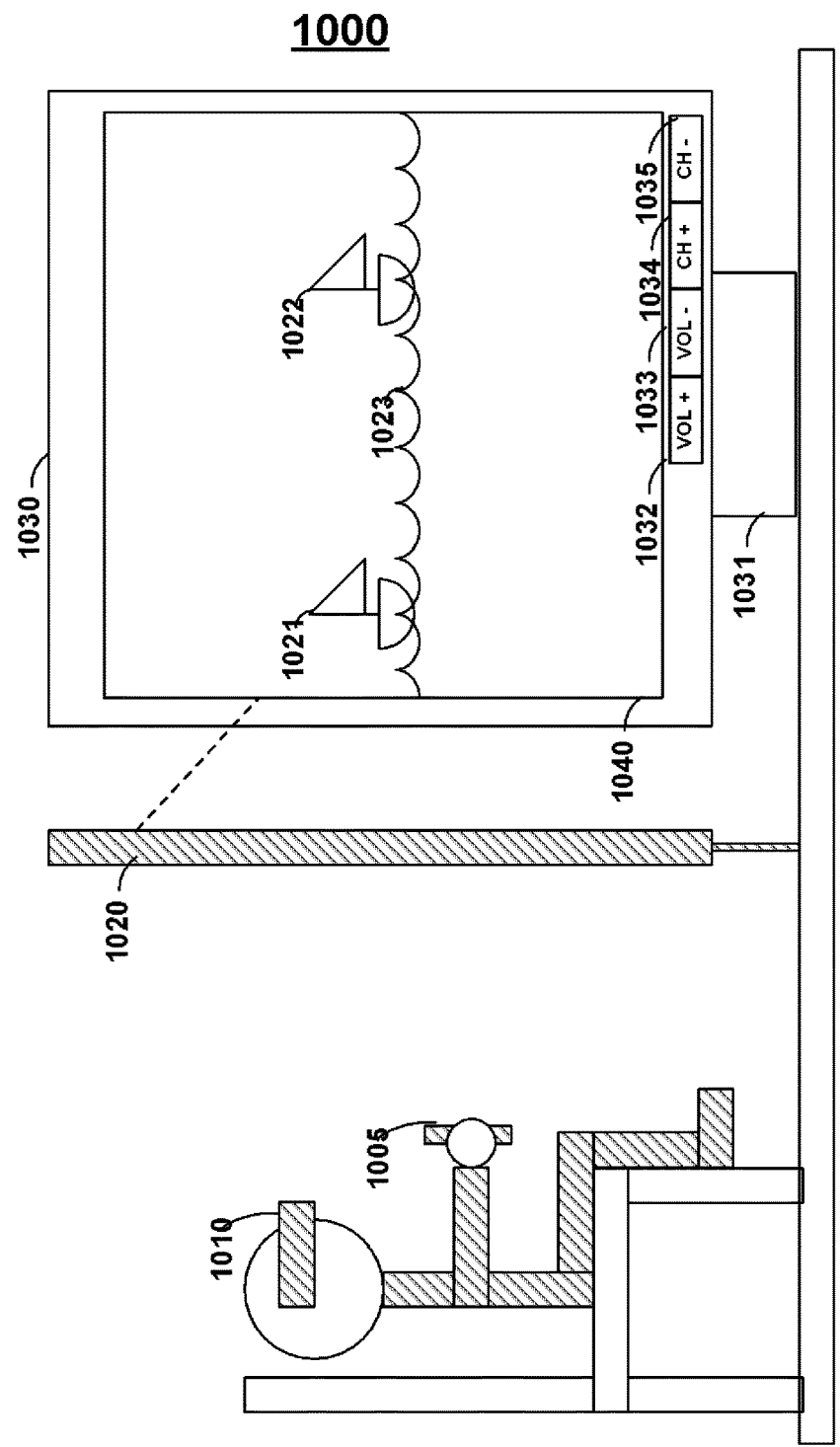
FIG. 10 is an illustration of virtual hardware constructed in accordance with the principles of the present invention.

FIG. 10 shows environment 100 that includes virtual hardware 1020 perceived by user 1010 utilizing controls 1005 in a physical environment. Persons skilled in the art will appreciate that voice-based controls and thought-based controls may also be utilized in addition to physical controls. A user may utilize a augmented reality computing platform to augment his/her physical environment in a variety of ways. One such way that an augmented reality computing platform may augment a user's environment is to introduce virtual hardware of objects a user desires to use. Virtual hardware may decrease the amount of physical clutter in a user's environment—thus increasing the potential areas for augmentation with virtual indicia. Additionally, virtual hardware devices may be purchased and downloaded on-demand. In doing so, for example, a user does not have to wait for a physical delivery of a physical object in order for that user to benefit from the whimsical and festive nature of that object.

Virtual hardware device perspective 1030 may be the perspective of virtual hardware device 1020 is perceived by a user wearing head-mounted display 1010 in the orientation of the user of head mounted display 1010 of environment 1000. Virtual hardware device 1020 may be, for example, a virtual television set. Such a virtual television set may include, for example, virtual frame 1030, virtual display area 1040, virtual base 1031, and virtual interfaces 1032, 1033, 1034, and 1035. A user may watch, for example, television on virtual display 1040. The user may watch a movie on display 1040. A user may play a two-dimensional video game on virtual display area 1040. For example, a two-dimensional video game may be provided via user-controlled virtual object 1021 on virtual gaming environment indicia 10203 with virtual object 1022. A two-dimensional gaming surface may show a game that is played in a three-dimensional world or a two-dimensional world. Similarly, an augmented reality video game may be provided on a surface (e.g., table top, wall, or floor) that is displayed on a two-dimensional surface (e.g., showing a game set in a two-dimensional or three-dimensional world). Virtual interface 1032 may be utilized, for example, to increase the volume of virtual hardware 1020. Virtual interface 1033 may be utilized, for example, to decrease the volume of virtual hardware 1020. Virtual interface 1034 may be utilized, for example, to increase the channel of virtual hardware 1020. Virtual interface 1035 may be utilized, for example, to decrease the channel of virtual hardware 1020. Person skilled in the art will appreciate that virtual hardware device 1020 may have virtual speakers and the computer program defining hardware device 1020 may instruct a head-mounted display to provide audio associated with hardware device 1020 in a manner that the audio is perceived by a user to emanate from such virtual speakers.

Figure 11:
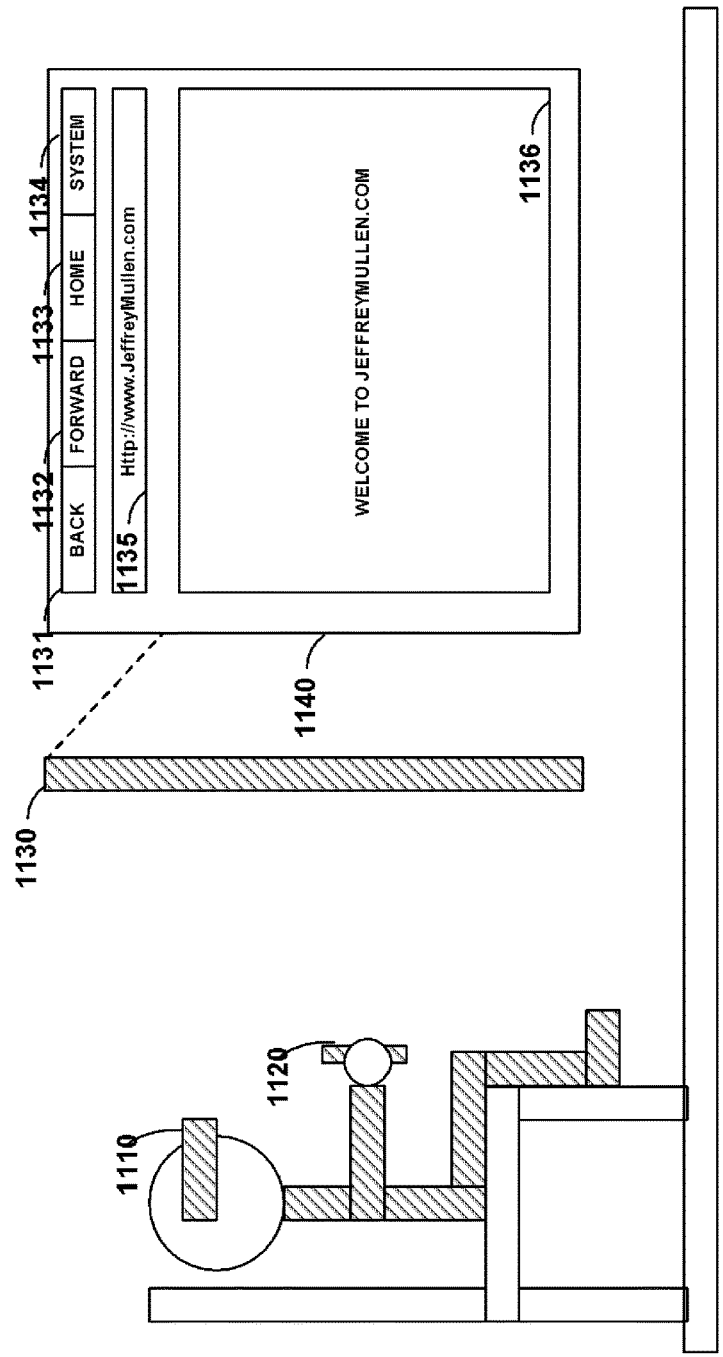
FIG. 11 is an illustration of a virtual browser constructed in accordance with the principles of the present invention.

FIG. 11 shows environment 1100 that may include a user that utilizes head-mounted display 1120 and controller 1120 to view augmented reality environments and provide controls to an augmented reality computing platform. Persons skilled in the art will appreciate that a stationary and/or portable display monitor (e.g., a handheld device with a display) may be utilized to provide a user with a stationary or portable keyhole into an augmented reality environment. Such a display may include a camera to take video, in which virtual indicia may be interlaced. Such a display may be transparent such that indicia may be provided on the transparent display. Virtual indicia may be provided to a user via contact lenses having displays or via images provided (e.g., shined) into a user's eye (e.g., retina).

Virtual browser 1130 may be provided. Virtual browser 1130 may allow a user to, for example, search an intranet and/or internet. For example, virtual browser 1130 may be perceived as virtual frame 1140, virtual browsing display area 1136, virtual address bar 1135, virtual back control interface 1131, virtual forward control interface 1132, virtual home interface 1133, and virtual system menu interface 1134. Persons skilled in the art will appreciate that virtual hardware and other objects may be set in particular locations. Such locations may be stored in a user's profile such that a user can turn ON an augmented reality computing platform and a user's physical environment can be populated with virtual hardware and other objects previously selected by a user. Virtual menu interface 1134 may, for example, cause browser 1140 to be replaced with a graphical user interface showing a menu page for an augmented reality computing system. Virtual menu interface 1134 may, for example, cause an augmented reality computing graphical user interface to appear in front of (e.g., and aligned or offset or separate from) virtual frame 1140.

Interfaces can be selected from a virtual graphical user interface or virtual hardware in a number of ways. A controller may be utilized as, for example, a pointer such that a virtual laser emanates out of an end of a controller. A virtual laser whose path intersects with a virtual interface may, for example, cause that virtual interface to change its appearance (e.g., appear highlighted). A user may then, for example, press a button to confirm selection of the virtual interface and an associated feature may be executed. Manual controls (e.g., a directional pad) may be utilized to navigate through executable portions of a graphical user interface or virtual object (e.g., virtual hardware). Voice-based and/or thought-based controls may also be utilized.

Figure 12:
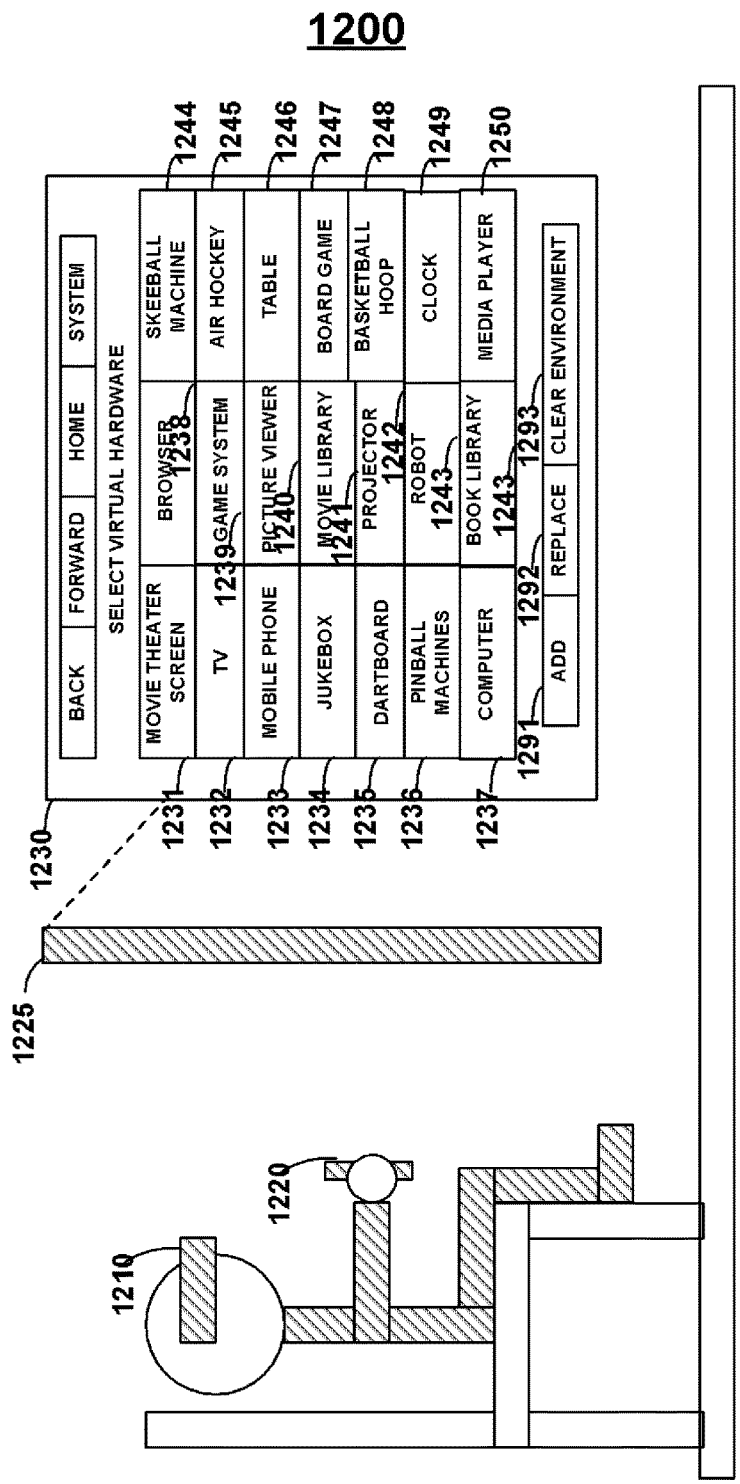
FIG. 12 is an illustration of a virtual graphical user interface for virtual hardware selection constructed in accordance with the principles of the present invention.

FIG. 12 shows environment 1200 that may include a user wearing a head-mounted device that includes a display (e.g., head-mounted display 1210) and a utilizing one or more controllers 1220. Virtual graphical user interface 1225 may be provided to a user and may include frame 1230 and virtual interfaces 1231-1250 and 1291-1293. Graphical user interface 1225 may allow a user to select a virtual hardware device to be introduced into the user's actual, physical environment. Persons skilled in the art will appreciate that a virtual reality topologies may also utilize virtual reality hardware devices and may include virtual reality hardware similar to the hardware of those of graphical user interface 1225.

A user may, for example, be allowed to set up one, a predetermined number of, or an unlimited number of a particular virtual hardware device. For example, the purchase of a virtual hardware dartboard may allow a user to deploy up to 3 virtual reality dartboards in his/her actual, physical environment.

Virtual interface 1231 may allow a user to add (e.g., augment) a movie theater screen into his/her physical environment. Virtual interface 1231 may be associated with, for example, one or more virtual television sets. The selection of virtual interface may cause, for example, a virtual hardware device to deploy or another graphical user interface to be introduced (e.g., replace interface 1225) so that the attributes of a virtual hardware device may be selected. Virtual interface 1232 may be associated with, for example, one or more telephonic devices such as mobile telephonic devices. Mobile virtual hardware devices may follow a user (e.g., may follow in front of a user as a user moves around, but may remain hidden until a request is received from a user to utilize a mobile virtual hardware device). Persons skilled in the art will appreciate that different virtual mobile telephones may include, for example, different telephonic features. For example, a virtual telephonic device may include one plan (e.g., a particular minutes per month, a particular data plan per month, and a particular users per month). For example, a virtual telephonic device may include the ability to play at least certain types of media files (e.g., a particular type of music, games, or video).

Virtual interface 1234 may be associated with, for example, one or more jukeboxes. Virtual interface 1235 may be associated with, for example, one or more dartboards. Virtual interface 1236 may be associated with, for example, one or more pinball machines. Virtual interface 1237 may be associated with, for example, one or more computers (stationary and/or portable). A virtual laptop may include, for example, virtual software such as virtual word processing, virtual spreadsheet software, virtual gaming software, virtual video playback software, virtual music playback software, or virtual operating system.

Virtual interface 1238 may be associated with, for example, a virtual browsing device. Virtual interface 1239 may be associated with, for example, one or more game consoles (e.g., static and/or portable augmented reality and/or virtual reality gaming consoles). Virtual interface 1240 may be associated with, for example, one or more picture viewers. Virtual interface 1241 may be associated with, for example, one or more movie libraries. A movie library may, for example, cause a virtual movie-storage shelf to be placed in a room with a virtual movie library. The virtual movies in such a virtual movie library may be rented or may be movies that were purchased by a user. For example, a user may purchase a physical movie-bearing medium (e.g., DVD) and may be provided with a code that may be entered using an augmented reality computing system to add a virtual copy of the movie to a user's virtual movie library. Virtual interface 1242 may be associated with, for example, one or more virtual projectors. Virtual interface 1243 may be associated with, for example, one or more virtual robots (e.g., robots that provide knowledge assistance via answers to user-initiated questions). Virtual interface 1243 may be associated with, for example, one or more virtual libraries (e.g., library storage shelves with virtual books). Virtual interface 1244 may be associated with, for example, one or more skeeball machines (e.g., the ball of which can be controlled, for example, via a controller). Virtual interface 1245 may be associated with, for example, one or more virtual air hockey tables (e.g., the paddles of which can be controlled, for example, via a controller). Virtual interface 1246 may be associated with, for example, one or more virtual tables for playing virtual objects on/around. Persons skilled in the art will appreciate that a virtual table may increase the whimsical and festive nature of an augmented reality by, for example, allowing a virtual hardware device to virtually rest on the virtual table instead of being perceived by a user as being suspended in mid-air without any underlying support.

Virtual interface 1247 may be associated with, for example, one or more virtual board games (e.g., checkers, chess, or backgammon). Virtual interface 1248 may be associated with, for example, one or more virtual basketball hoops. Virtual interface 1249 may be associated with, for example, one or more clocks. Virtual interface 1250 may be associated with, for example, one or more virtual media players.

Virtual interface 1291 may allow, for example, a user to add or purchase a virtual hardware device. Virtual interface 1292 may allow a user, for example, to replace a deployed virtual hardware device in an augmented reality setting with another virtual hardware device. Virtual interface 1293 may allow, for example, a user to clear his/her augmented reality environment such that, for example, a user perceives his/her physical environment without any virtual indicia augmented onto the user's physical environment.

Figure 13:
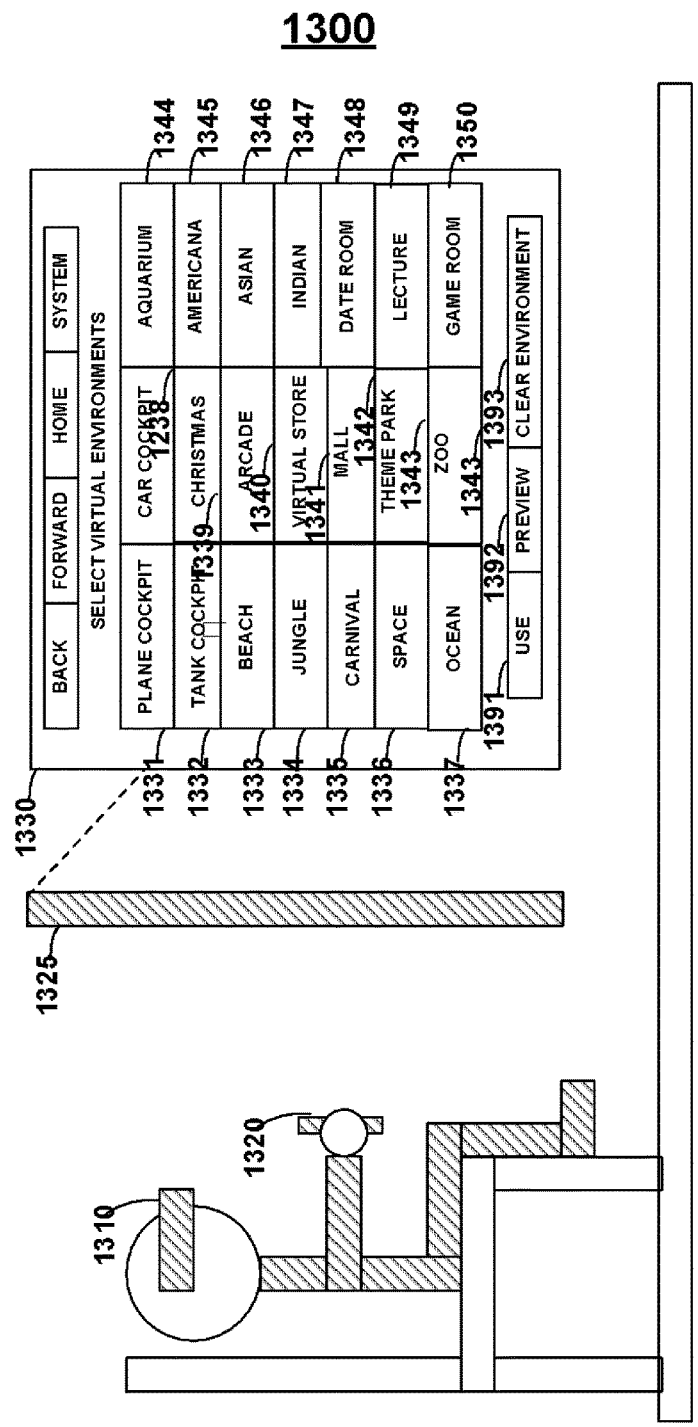
FIG. 13 is an illustration of a virtual graphical user interface for virtual environment selection constructed in accordance with the principles of the present invention.

FIG. 13 shows environment 1300 that may include a user having head-mounted augmented reality system 1310 and controller 1320. Virtual graphical user interface 1325 may be provided and may be perceived by a user as having frame 1330. A user may select virtual environments. Virtual environments may augment all or, or at least a portion of, a user's actual environment. Virtual environments may be utilized to increase the whimsical and festive nature of a user's augmented environment. Virtual environments may also be utilized by programs, such as augmented reality video games. Virtual interface 1331 may be utilized to provide a user with, for example, a plane cockpit environment. A plane cockpit environment may immerse a user into an environment that is more representative of a plane cockpit then the physical environment of a user. A plane cockpit environment may include, for example, virtual objects that are user-controllable such as, for example, virtual switches, knobs, wheels, and other virtual controls. A plane cockpit environment may include, for example, virtual displays (e.g., virtual altimeter and virtual horizon displays). A virtual cockpit environment may include, for example, a virtual cockpit dashboard. Persons skilled in the art will appreciate that if a virtual reality gaming program is initiated, then a user may be provided with a virtual world. However, such a virtual world may be provided about physical objects such that, for example, a user does not accidently trip over a physical object. Placement of virtual indicia may be autonomously determined by an augmented reality computing system.

Virtual interface 1332 may be utilized to provide a user with, for example, a tank cockpit environment. Virtual interface 1333 may be utilized to provide a user with, for example, a beach. Virtual interface 1331 may be utilized to provide a user with, for example, a jungle environment. Virtual interface 1336 may be utilized to provide a user with, for example, a space environment. Virtual interface 1331 may be utilized to provide a user with, for example, a plane cockpit environment. Virtual interface 1337 may be utilized to provide a user with, for example, an ocean environment (e.g., an underwater environment or a boat deck environment). Virtual interface 1338 may be utilized to provide a user with, for example, a car cockpit environment. Virtual interface 1339 may be utilized to provide a user with, for example, a Christmas environment. Virtual interface 1340 may be utilized to provide a user with, for example, an arcade environment (e.g., an environment with multiple arcade games). Virtual interface 1341 may be utilized to provide a user with, for example, a virtual store environment (e.g., a virtual electronics store). Virtual interface 1342 may be utilized to provide a user with, for example, a virtual mall environment (e.g., with multiple virtual stores). Virtual interface 1343 may be utilized to provide a user with, for example, a virtual theme park environment. Virtual interface 1343 may be utilized to provide a user with, for example, a virtual zoo. Persons skilled in the art will appreciate that the use of virtual environments may be associated with, for example, a one-time, subscription based, or feature-dependent cost. Vendors may provide interfaces associated with augmented environments on an intranet that multiple augmented reality computing systems are in communication with. Virtual interface 1344 may be utilized to provide a user with, for example, a virtual aquarium. Virtual interface 1345 may be utilized to provide a user with, for example, a virtual Americana environment. Virtual interface 1346 may be utilized to provide a user with, for example, a virtual Asian environment. Virtual interface 1347 may be utilized to provide a user with, for example, a virtual Indian environment. Virtual interface 1348 may be utilized to provide a user with, for example, a virtual dating room. Persons skilled in the art will appreciate that multiple users may utilize an augmented environment. Users in other locations (e.g., other houses) may be allowed, for example, to have a three-dimensional virtual avatar to be virtualized in the houses of other users. Accordingly, for example, a dating room environment may be provided that allows a particular number of users (e.g., 2) to be virtualized via an avatar in the physical environment of the other users such that a more personal form of communication may be perceived. Virtual interface 1349 may be utilized to provide a user with, for example, a virtual lecture environment (e.g., where a teacher provides a teaching avatar to the environments of the students and students provide student avatars to the environment of the teacher). Virtual interface 1350 may be utilized to provide a user with, for example, a virtual game room environment.

Virtual interface 1391 may be utilized by a user to utilize a virtual environment. Virtual interface 1392 may be utilized by a user to preview a virtual environment (e.g., via a virtual display screen augmented into a user's physical environment). Virtual interface 1393 may be utilized to, for example, clear a user's physical environment of virtual environment indicia or all virtual indicia.

Figure 14:
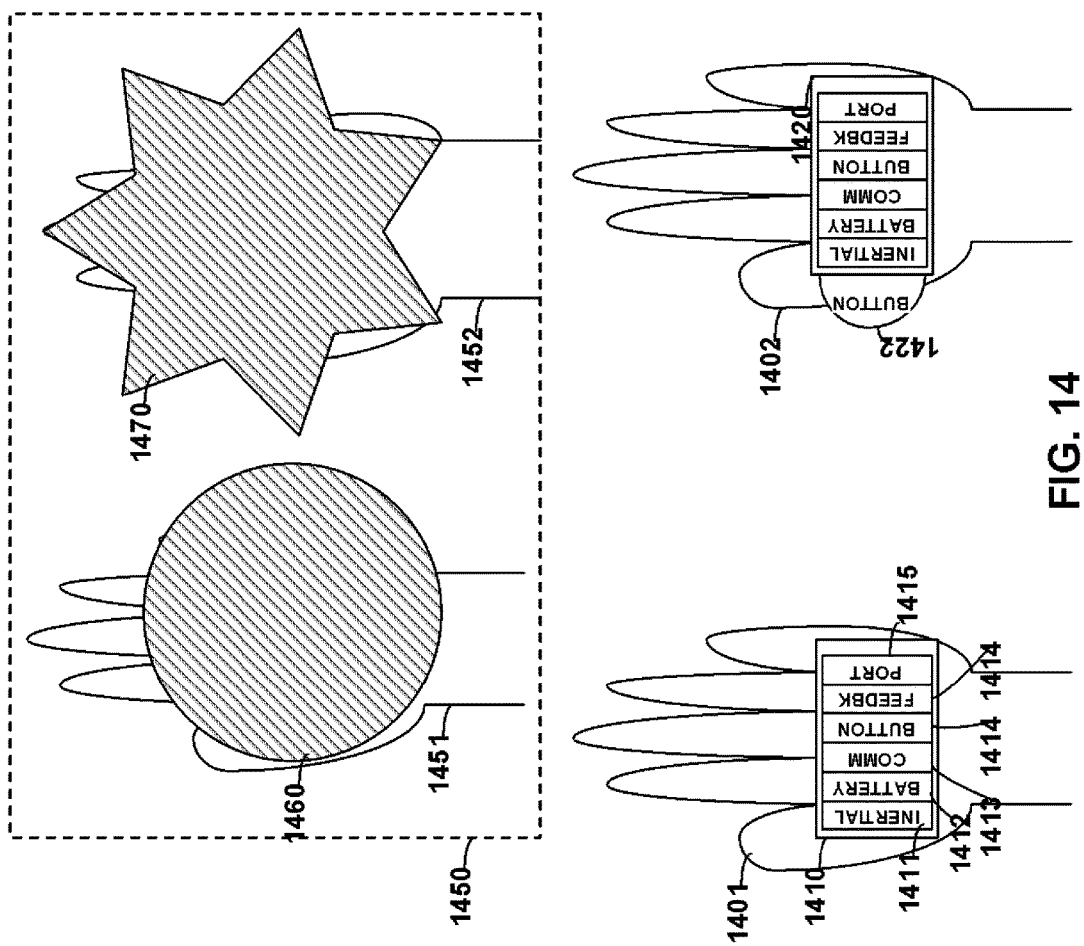
FIG. 14 is an illustration of controllers constructed in accordance with the principles of the present invention.

FIG. 14 shows environment 1400. User hand 1401 and user hand 1402 may each hold a controller. For example, user hand 1401 may hold controller 1410 and user hand 1402 may hold controller 1420. Each controller may include positioning and/or inertial movement determination devices such that the location/movement of a controller can be communicated to an augmented reality computing system. Accordingly, a user may utilize his/her hands as general controls to an augmented reality application such as an augmented reality game. A user's hand may be replaced with virtual indicia (from the perspective of the user utilizing an augmented reality head-mounted display). Virtual indicia may be augmented on top of a user's hand. Accordingly, for example, a user may be perceived as holding a virtual object such as a virtual basketball. A user may, gripping a controller, shoot the virtual basketball towards a virtual basketball hoop the user installed in his/her living room. Furthermore, for example, the virtual basketball may react with a user's physical environment. For example, a user's head-mounted display may include cameras that are operable to view more of a user's environment than the user can perceive. The augmented reality system may determine, for example, the location of walls, floors, and other objects. In or near real time, for example, the augmented system may determine that a virtual basketball that was thrown by a user at a trajectory has hit a physical surface (e.g., a ceiling) and the augmented system may utilize this information to change the course of the virtual ball (e.g., by causing the ball to be perceived by the user to bounce off the user's ceiling). A user may perceive his/her hand via perception 1450 such that hand 1401 is perceived as hand 1451 having virtual indicia (e.g., ball) 1460. A user may perceive his/her hand 1402 to be hand 1452 having virtual indicia (e.g., star) 1470). A user may play an augmented reality game that includes virtual indicia (e.g., a virtual star floating mid-air in a user's physical environment). The user may, gripping a controller, pass his/her hand through the star. In doing so, for example, the star may "stick" to a user's hand. Accordingly, a user may interact and move virtual indicia using his/her hands. One or more buttons may be associated with particular virtual object interactions (e.g., picking up, putting down, using an object). For example, a game may include a virtual jar of virtual liquid. A user may swipe his/her hand through the virtual jar of virtual liquid and the virtual jar may be perceived to stick to a user's hand as the user grips the controller. The user may press one button to release the jar. The user may press another button to use (e.g., drink in the video game) the virtual contents of the virtual jar.

A controller may include any number of devices. For example, controller 1411 may include inertial movement determination devices 1411 (e.g., an array of accelerometers and gyroscopes), battery 1412, communication devices (e.g., receivers and transmitters) 1413, buttons 1414, feedback devices (e.g., vibrational feedback devices) 1414, and extension ports 1415 (e.g., for one or more peripheral devices such as memory cartridges). Controller 1420 may include, for example, button 1422 located at one end of a controller. A controller may be, for example, generally cylindrical in shape.

Figure 15:
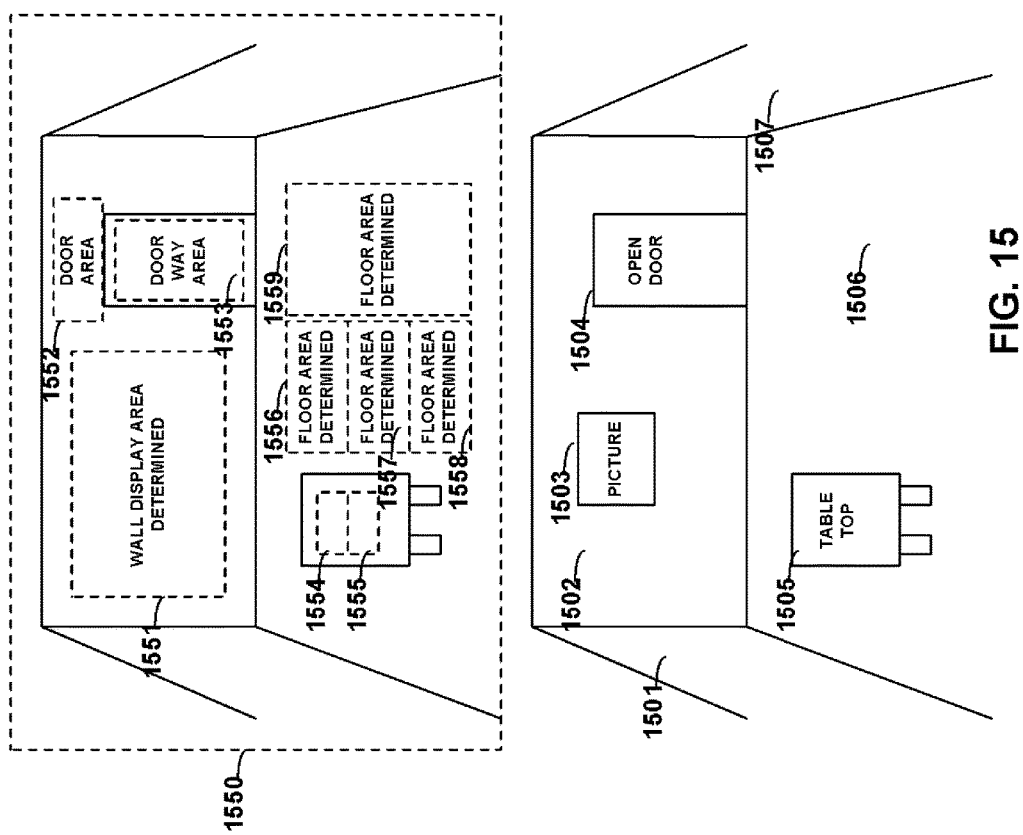
FIG. 15 is an illustration of a physical environment determination scheme constructed in accordance with the principles of the present invention.

FIG. 15 shows physical environment 1500 and augmented reality usable area determination perception 1550. A user's physical environment may include numerous objects. For example, a user's physical environment may be an outdoor environment that is relatively open or includes trees, a pond, and other people. Alternatively, for example, a user's physical environment may be an indoor environment that includes wall 1501, wall 1502, picture 1503, doorway 1504, wall 1507, table 1505, and floor 1506. An augmented reality computing system may, for example, include a head-mounted display that includes a number of video cameras that can capture video of an area larger than a user can perceive. A user, at the start of a game, application, may be asked to turn around 360 degrees at a particular speed such that a camera system may obtain a scan of a room. Alternatively, for example, a system may include cameras that face all directions such that the system can autonomously obtain a 360 degree field of view. The system can then, for example, determine open surface areas over which virtual indicia may be augmented. An environment and/or game may include a list of virtual indicia to augment into a user's environment. This list may be prioritized such that, for example, a game can be played in a room even if there is not enough room to place all of the virtual indicia in a room. Virtual indicia may also be associated with whether the game can be played without the virtual indicia. For example, an enemy character may be associated with an augmentation profile that does not allow the game to be played if the enemy character cannot be augmented adequately into a user's environment. A virtual environment indicia (e.g., virtual picture for a wall) may be associated with an augmentation profile that allows the game to be played if the virtual picture cannot be augmented adequately into a user's environment. An augmentation profile may be associated with each virtual indicia. For example, an augmentation profile may include the type of object over which the object can be augmented (e.g., one virtual object may be associated with a floor or table surface, another virtual object may be associated with a wall). An augmentation profile may include the area a virtual object requires to move around (e.g., for a computer-controlled virtual character/object). An augmented computing system may, for example, determine different area combinations that may be provided such that the augmented computing system may determine the most virtual indicia that can be introduced into an environment or the most virtual indicia having at least a particular priority.

An augmented reality computing system may scale areas and, accordingly, change the behavior of particular virtual objects such that more virtual objects may be introduced into a user's environment. Persons skilled in the art will appreciate that scaling the size and movement ability of virtual characters/objects may, for example, change the difficulty of a game. Accordingly, for example, a user may be provided with handicaps to counter any such difficulty (e.g., in a shooting game a smaller virtual object may be associated with more points).

Perception 1550 may be determined by an augmented reality computing system, which may, in turn, determine useable areas 1551-1559. Persons skilled in the art will appreciate that useable portion of an environment may be determined as a useable surface area and/or usable volume.

Figure 16:
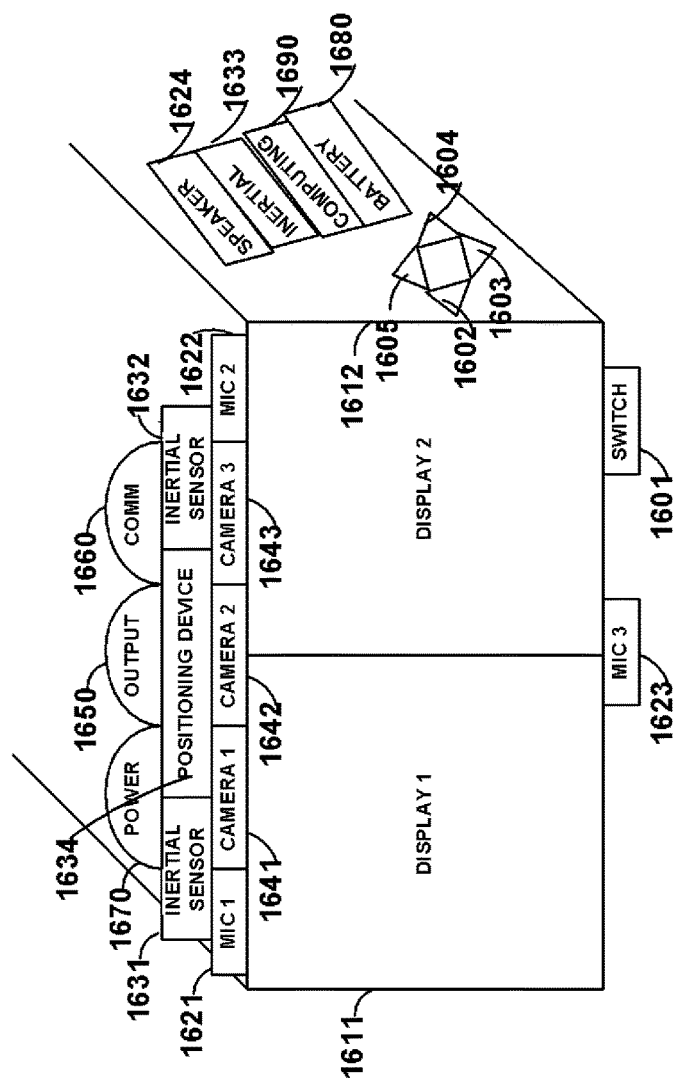
FIG. 16 is an illustration of a head-mounted display constructed in accordance with the principles of the present invention.

FIG. 16 may include, for example, head-mounted augmented reality system 1600. System 1600 may include, for example, display 1611 and display 1612. Persons skilled in the art will appreciate that a head-mounted display may include two displays. These two displays may be transparent (and virtual indicia provided on or projected onto the display) or these two displays may be non-transparent (and virtual indicia interlaced with real, or near real time, video captured of a user's perceived environment if no head-mounted display was presented. The two displays may show different perspectives of an augmented reality such that a user visualizes one perspective of an augmented reality. System 1600 may include, for example, microphones 1621-1623 for picking up sounds from a user's environment (e.g., microphones 1621 and 1622) as well as those spoken from a user (e.g., microphone 1623). System 1600 may include one or more manual switches 1601 (e.g., to turn a system ON or OFF or to receive manual input associated with other actions). Manual-input receiving interfaces 1601-1604 may also be provided to receive manual inputs from a user (e.g., to receive manual input to assist in selecting options on a virtual hardware device, graphical user interface, or browser. System 1600 may include two portions that extends along the side of a user's head to support the system—each of which may include, for example, one or more speakers 1624, inertial movement determination devices 1633, computing circuitry (e.g., processors) 1690, and rechargeable/non-rechargeable permanent/replaceable batteries 1680.

System 1600 may include, for example, any number of cameras such as cameras 1641-1643. The view of cameras may overlap such that surface areas and object structures can more easily be determined by an augmented reality system. Any number of inertial movement determination devices 1631 and 1632 may be provided as well as positioning devices 1634. A system may include, for example, a telephonic capability such that one user of one augmented reality system may verbally communicate with another user of another augmented reality system. Communications device 1660 may include, for example, a telephonic communications component. Augmented reality information (e.g., game information) may also be communicated via communications device 1660 (e.g., and stored at an intermediary server that delivers the information to user-permitted augmented reality users). Wireless power receiver 1670 may be included to wirelessly receive power from a wireless source of power. Persons skilled in the art will appreciate that inertial movement determination devices may be utilized to determine a users permission. Acceleration data may be integrated to determine velocity data. Velocity data may be integrated to determine position data. Positioning devices may include, for example, satellite positioning signal receivers and/or local positioning receivers. Mobile telephone base stations or gaming devices located about a user's environment may signal with a portable system to determine the position of the system via, for example, triangulation. A system may wirelessly communicate with an external processing system (e.g., stationary video game console). A system may communicate with an external processing system (e.g., stationary video game console) via wire-based communications. Persons skilled in the art will appreciate that a remote server may be utilize to assist in processing game data and a user may store game, or other augmented reality system data, on a remote server.

Persons skilled in the art will also appreciate that the present invention is not limited to only the embodiments described. Instead, the present invention more generally involves video games—both mobile and stationary. Persons skilled in the art will also appreciate that the apparatus of the present invention may be implemented in other ways then those described herein. All such modifications are within the scope of the present invention, which is limited only by the claims that follow.

What is claimed is:

1. A system comprising:
   a game system for providing a video game;
   a head-mounted display having a video camera for obtaining images in the proximity of said head-mounted display and utilizing said images to detect a surface of a physical object within the proximity of said head-mounted display, wherein said head-mounted display is operable to communicate information to said game system and said head-mounted display is operable to display a virtual object; and
   a game controller for providing a first three-dimensional control signal to move said virtual object and a second three-dimensional control signal to change the movement of said virtual object from the movement provided from said first three-dimensional control signal, wherein said first three-dimensional control signal moves said virtual object three-dimensionally over at least three axis of movement in a first manner and said second three-dimensional control signal moves said virtual object three-dimensionally over at least three axis of movement in a second manner causing said virtual object to interact with said detected surface.

2. The system of claim 1, wherein said head-mounted display comprises a non-transparent display.

3. The system of claim 1, wherein said video game has a selectable playing area.

4. The system of claim 1, wherein said game controller includes buttons.

5. The system of claim 1, wherein said video game is a board game.

6. The system of claim 1, wherein said video game is a sports game.

7. The system of claim 1, wherein said head mounted display is powered wirelessly.

8. The system of claim 1, wherein said controller is powered wirelessly.

9. The system of claim 1, further comprising a second camera.

10. The system of claim 1, further comprising a second camera and a third camera.

11. The system of claim 1, further comprising a second camera and a third camera and the views of said second and third camera overlap.

12. The system of claim 1, further comprising a telephonic communications component.

13. The system of claim 1, further comprising a selected virtual environment.

14. The system of claim 1, further comprising a switch.

15. The system of claim 1, further comprising a microphone.

16. The system of claim 1, further comprising a first microphone and a second microphone.

17. The system of claim 1, further comprising a first microphone, a second microphone, a second camera, and a third camera.

18. The system of claim 1, further wherein said head-mounted display comprises a transparent display.

19. The system of claim 1, further comprising a microphone and a second camera.

20. The system of claim 1, further comprising a microphone and a second camera, wherein said head-mounted display comprises a transparent display.

* * * * *